(12) United States Patent
Cho et al.

(10) Patent No.: US 11,574,375 B2
(45) Date of Patent: Feb. 7, 2023

(54) ELECTRONIC DEVICE AND AUTHENTICATION METHOD THEREOF

(71) Applicant: Samsung Electronics Co., Ltd., Suwon-si (KR)

(72) Inventors: Kyungsun Cho, Suwon-si (KR); Jinsu Kim, Suwon-si (KR); Junbum Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/362,050

(22) Filed: Mar. 22, 2019

(65) Prior Publication Data

US 2019/0295203 A1  Sep. 26, 2019

(30) Foreign Application Priority Data

Mar. 22, 2018 (KR) ........................ 10-2018-0033342

(51) Int. Cl.
*G06Q 50/26* (2012.01)
*G06Q 50/00* (2012.01)
(Continued)

(52) U.S. Cl.
CPC ........... *G06Q 50/265* (2013.01); *G06N 20/00* (2019.01); *G06Q 50/01* (2013.01); *H04L 63/0861* (2013.01)

(58) Field of Classification Search
None
See application file for complete search history.

(56) References Cited

U.S. PATENT DOCUMENTS 9,071,618 B1 * 6/2015 Pruthi .................. H04L 63/105
9,648,171 B1    5/2017 Eftekhari et al.
(Continued)

FOREIGN PATENT DOCUMENTS

JP      2006-236358 A     9/2006
KR  10-2013-0122306 A    11/2013
(Continued)

OTHER PUBLICATIONS

Sharma, Madhu, and Vijay Singh Rathore. "A Framework for safe mode alarm reporting technique (SMART) in ATMs." International Journal of Computer Applications 96.1 (2014): 10-12. (Year: 2014).*

(Continued)

*Primary Examiner* — Andrew B Whitaker
(74) *Attorney, Agent, or Firm* — Jefferson IP Law, LLP

(57) ABSTRACT

An electronic device is provided. The electronic device includes a camera, a memory configured to store a model learned to determine whether a user performing authentication for a financial service is in a threat situation, and a processor configured to perform authentication for the financial service based on biometrics information of the user performing authentication for the financial service. The processor may acquire an image by photographing the user performing authentication through the camera, acquire information on whether the user performing authentication is in a threat situation from the learned model, with information acquired from the image as input of the learned model, and perform authentication for the financial service according to the acquired information. At least a part of the learned model is an artificial intelligent algorithm, which may be performed according to at least one of machine learning, neural network, or deep learning algorithm.

18 Claims, 11 Drawing Sheets

(51) Int. Cl.
*G06N 20/00* (2019.01)
*H04L 9/40* (2022.01)

(56) References Cited

U.S. PATENT DOCUMENTS

| | | | |
|---|---|---|---|
| 9,891,792 B1 | 2/2018 | Morin et al. | |
| 10,089,809 B1* | 10/2018 | Daly | G06Q 10/00 |
| 2010/0106573 A1* | 4/2010 | Gallagher | G06Q 50/01 |
| | | | 705/14.4 |
| 2012/0308971 A1 | 12/2012 | Shin et al. | |
| 2013/0239191 A1 | 9/2013 | Bostick | |
| 2014/0201537 A1* | 7/2014 | Sampas | G06V 40/13 |
| | | | 713/186 |
| 2015/0066764 A1* | 3/2015 | Crowell | G06Q 20/409 |
| | | | 705/44 |
| 2015/0229622 A1* | 8/2015 | Grigg | G06F 21/31 |
| | | | 726/5 |
| 2016/0277439 A1* | 9/2016 | Rotter | G06V 40/13 |
| | | | 713/186 |
| 2016/0378961 A1* | 12/2016 | Park | G06F 21/36 |
| | | | 726/19 |
| 2017/0032186 A1 | 2/2017 | Murata et al. | |
| 2017/0086050 A1* | 3/2017 | Kerning | H04W 4/026 |
| 2017/0118025 A1* | 4/2017 | Shastri | H04L 9/3231 |
| 2017/0148241 A1* | 5/2017 | Kerning | H04W 12/08 |
| 2017/0251366 A1 | 8/2017 | Perna et al. | |

FOREIGN PATENT DOCUMENTS

| | | |
|---|---|---|
| KR | 10-1372365 B1 | 3/2014 |
| KR | 10-1529462 B1 | 6/2015 |
| KR | 10-2015-0115392 A | 10/2015 |
| KR | 10-2016-0005204 A | 1/2016 |
| KR | 10-2016-0090994 A | 8/2016 |
| KR | 10-2016-0131678 A | 11/2016 |
| KR | 10-2017-0035545 A | 3/2017 |

OTHER PUBLICATIONS

Extended European Search Report dated Jul. 10, 2020, issued in European Patent Application No. 19770393.7-1222.
International Search Report and Written Opinion dated Jul. 10, 2019, issued in International Patent Application No. PCT/KR2019/003383.
European Search Report dated Jun. 15, 2021; European Appln. No. 19 770 393.7-1222.
European Search Report dated Jun. 1, 2022; European Appln. No. 19 770 393.7-1218.
European Preliminary Report dated Oct. 25, 2022; European Appln. No. 19 770 393.7-1218.
European Minutes of the oral proceedings dated Nov. 23, 2022; European Appln. No. 19 770 393.7-1218/3714419.
European Decision to Refuse dated Nov. 30, 2022; European Appln. No. 19 770 393.7-1218.

* cited by examiner

ELECTRONIC DEVICE AND AUTHENTICATION METHOD THEREOF

CROSS-REFERENCE TO RELATED APPLICATION(S)

This application is based on and claims priority under 35 U.S.C. § 119(a) of a Korean patent application number 10-2018-0033342, filed on Mar. 22, 2018, in the Korean Intellectual Property Office, and the disclosure of which is incorporated by reference herein in its entirety.

BACKGROUND

1. Field

The disclosure relates to an electronic device and an authentication method thereof More particularly, the disclosure relates to an electronic device capable of providing a financial service and an authentication method thereof.

2. Description of Related Art

Recently, with the development of electronic technology, users are provided with a financial service in a gradually convenient manner For example, a user may execute a financial application through a portable device such as a smartphone and receive various financial services provided by a financial company. In particular, a user may perform authentication in a more convenient way through biometrics information when authentication for a financial service is performed.

As various social crimes increase, it frequently happens that a user transfers money to another person's account against his or her intention due to threats, intimidation, or coercion.

Accordingly, a solution to protect a user and an account of the user is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device to acquire information on whether a user performing authentication for a financial service is in a threat situation using a learned model and perform authentication, and a method for authentication thereof.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a memory configured to store a learned model learned to determine whether a user performing authentication for a financial service is in a threat situation, and a processor configured to perform authentication for the financial service based on biometrics information of the user performing authentication for the financial service, acquire an image by photographing the user performing authentication through the camera, acquire information on whether the user performing authentication is in a threat situation from the learned model, with information acquired from the image as input of the learned model, and perform authentication for the financial service according to the acquired information.

The learned model may determine whether the user is in a threat situation using information on at least one of a movement of the user's eyes, pulse rate, facial color change, facial expression, a place where the user is present, or relevance to other persons around the user.

The learned model may receive input of personalized information of the user and common information of a plurality of arbitrary users in relation to the pulse rate, eye movement, facial color change, and facial expression, and determine whether the user is in a threat situation based on the personalized information, the common information, and the information acquired from the image.

The biometrics information may include at least one of a voice, a face, or a fingerprint of the user.

The processor may perform authentication for the financial service using predetermined specific biometrics information from among the user's voice, face, fingerprint, or a combination of the face and fingerprint.

The learned model may determine that the user performing the authentication is in a threat situation, based on the authentication for the financial service being performed through the voice of the user.

The learned model may determine that the user performing the authentication is in a threat situation, based on the user making a specific gesture through the face or making a specific gesture through the finger during recognition of the fingerprint.

The processor may, based on information indicating that the user is not in a threat situation being acquired from the learned model, perform authentication for the financial service based on the biometrics information, and based on information indicating that the user is in a threat situation being acquired from the learned model, reject the authentication for the financial service or perform fake authentication.

The processor may, based on the fake authentication being performed, provide a user interface (UI) indicating that the financial service is performed normally, and transmit, to a financial company server, a request to lock a transaction account in which the financial service is made.

In accordance with another aspect of the disclosure, an authentication method for an electronic device is provided. The authentication method for an electronic device includes acquiring an image by photographing a user performing the authentication through a camera, acquiring information on whether the user performing the authentication is in a threat situation from a learned model stored in a memory of the electronic device, with information acquired from the image as input of the learned model, and performing authentication for the financial service according to the acquired information.

The performing the authentication may include performing authentication for the financial service using predetermined specific biometrics information from among the user's voice, face, fingerprint and a combination of the face and fingerprint.

The performing the authentication may include, based on information indicating that the user is not in a threat situation being acquired from the learned model, performing authentication for the financial service based on the biometrics information, and based on information indicating that the user is in a threat situation being acquired from the learned model, rejecting the authentication for the financial service or performing fake authentication.

The authentication method may further include, based on the fake authentication being performed, providing a UI indicating that the financial service is performed normally, and transmitting, to a financial company server, a request to lock a transaction account in which the financial service is made.

According to various embodiments of the disclosure, a user in a dangerous situation and an account of the user may be protected effectively.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
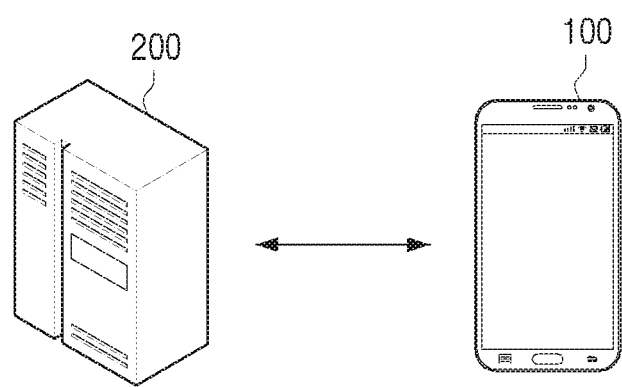
FIG. 1A is a view provided to describe a method for performing a financial service through an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications, of the various embodiments described herein can be made without departing from the scope and spirit of the disclosure. In addition descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, the term "has," "may have," "includes" or "may include" indicates existence of a corresponding feature (e.g., a numerical value, a function, an operation, or a constituent element such as a component), but does not exclude existence of an additional feature.

In the description, the term "A or B," "at least one of A or/and B," or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. Without departing from the scope as described herein, a first element may be referred to as a second element, or similarly, a second element may be referred to as a first element.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) between the element and the other element.

Herein, the expression "configured to" can be used interchangeably with, for example, "suitable for", "having the capacity to", "designed to", "adapted to", "made to", or " capable of". The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that can perform the corresponding operations by executing one or more software programs stored in the memory device.

The electronic device according to an embodiment of the disclosure may be implemented as a smartphone. In addition, the electronic device may be implemented as a tablet personal computer (PC), a mobile phone, a video phone, an e-book reader, a desktop PC, a laptop PC, a netbook computer, a personal digital assistant (PDA), a portable multimedia player (PMP), an moving picture experts group phase 1 or phase 2 (MPEG-1 or MPEG-2) audio layer-3 (MP3) player, a mobile medical instrument, a camera, internet of things or a wearable device.

Figure 1B:
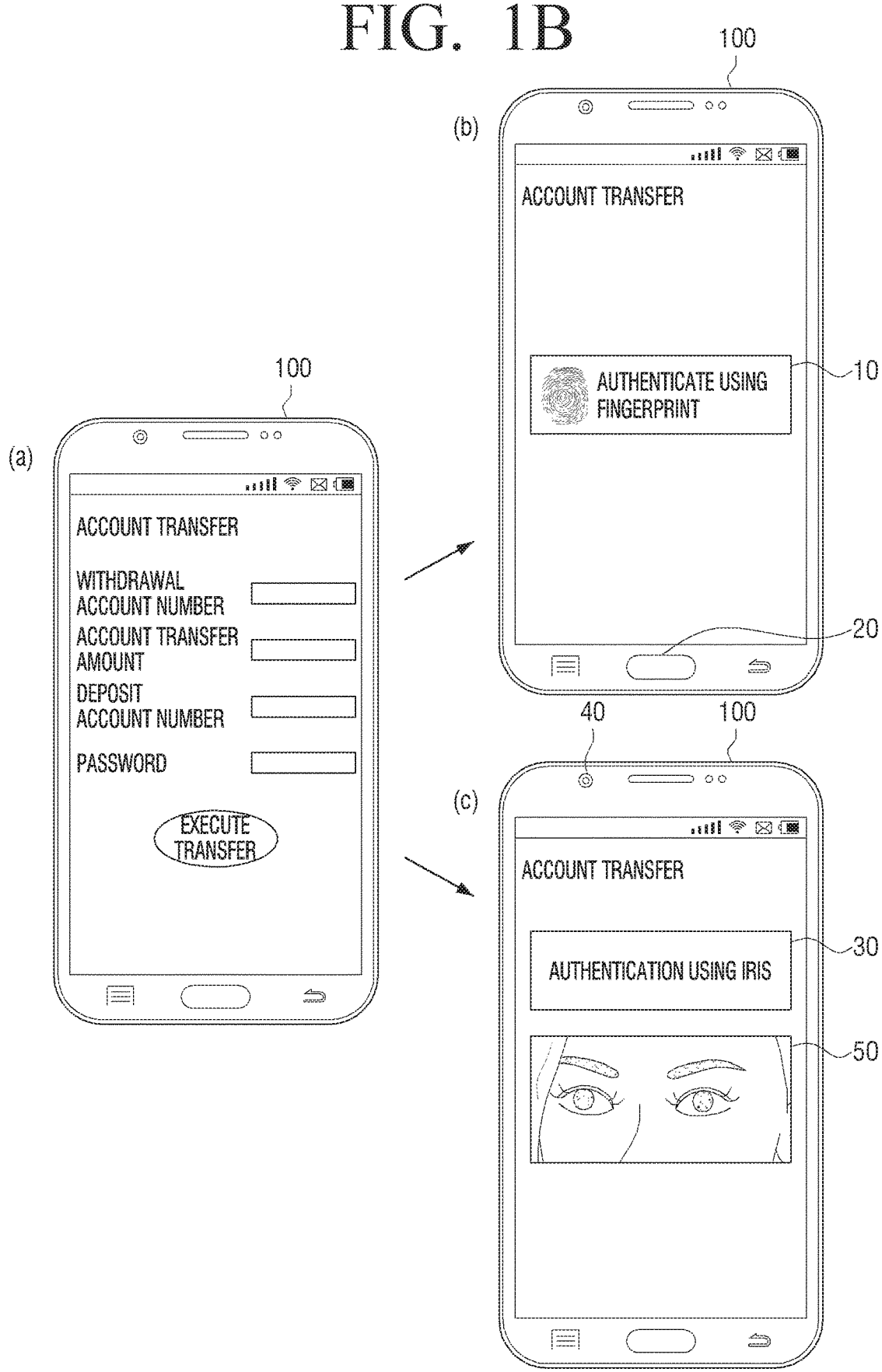
FIG. 1B is a view provided to describe a method for performing a financial service through an electronic device according to an embodiment of the disclosure.

FIGS. 1A and 1B are views provided to describe a method for performing a financial service through an electronic device according to various embodiments of the disclosure.

Referring to FIG. 1A, an electronic device 100 may provide a financial service. The financial service may include various services related to finance such as account transfer, remittance, deposit, and the like.

The financial service may be provided through a financial transaction service application (hereinafter referred to as a financial application) provided by a financial company such as a bank and a securities company. The electronic device 100 may download and install the financial application from an application store (e.g., PlayStore™).

The electronic device 100 may execute the financial application according to a user's input, and display a screen provided by the financial application. The electronic device 100 may receive financial information (for example, a withdrawal account number, a withdrawal account password, a deposit account number, an account transfer amount, etc.) through a screen provided by the financial application, and transmit a request for a financial service including the input financial information to a financial company server 200. Accordingly, the financial company server 200 may perform a procedure of providing a financial service according to the request for a financial service received from the electronic device 100.

The electronic device 100 may perform authentication using biometrics information in order to provide a financial service. Here, the biometrics information may include information about at least one of a voice, a face, an iris, or a fingerprint.

The electronic device 100 may perform authentication using a fast identity online (FIDO) method. The electronic device 100 may prestore biometrics information of a user in a security area or various chips (for example, a universal subscriber identity module (USIM) chip, an integrated circuit (IC) chip, or a hardware security module (HSM) chip) separately allocated to the electronic device 100 and compare the stored biometrics information with the biometrics information acquired from the user, and perform the authentication.

In order to perform various financial services such as log-in and account transfer, authentication using the biometrics information may be performed.

Referring to FIG. 1B(A), for account transfer, the electronic device 100 may display a screen to receive a withdrawal account number, a withdrawal account password, a deposit account number and an account transfer amount. In this case, the user may input various financial information required to conduct account transfer through the screen and input an account transfer command.

The electronic device 100 may transmit a request for financial services including the input financial information to the financial company server 200, and the financial company server 200 may request authentication to the electronic device 100 before proceeding with the financial service procedures according to the request for financial services.

The electronic device 100, when receiving an authentication request from the financial company server 200, may perform authentication using biometrics information.

Referring to FIG. 1B (B), when performing authentication using the fingerprint, the electronic device 100 may display a user interface (UI) screen 10 requesting input of the fingerprint. When the user touches a button 20 by the finger, the electronic device 100 may read a fingerprint image from the touched finger through a fingerprint recognition sensor provided in the button 20 and acquire fingerprint information.

The electronic device 100 may recognize the fingerprint information acquired through the fingerprint recognition sensor, compare the recognized fingerprint information with the fingerprint previously registered in the electronic device 100, and determine whether the fingerprints match with each other. If it is confirmed that the fingerprints match with each other, the authentication using the fingerprint may be completed.

The electronic device 100 may transmit, to the financial company server 200, authentication completion information indicating that the authentication using the fingerprint is completed. Accordingly, the financial company server 200 may perform the procedure for executing the account transfer according to the request for financial services received from the electronic device 100.

As another example, as illustrated in FIG. 1B (C), if authentication is performed using iris, the electronic device 100 may display a UI screen 30 requesting iris input, and photograph (or capture) an image by a camera 40 provided on a front side of the electronic device 100.

In this case, the electronic device 100 may display an image 50 photographed through the camera 40 and acquire the iris information of the user from the photographed image. The electronic device 100 may compare the acquired iris information with the iris pre-registered in the electronic device 100 to determine whether the irises match with each other. If it is confirmed that the irises match with each other, the authentication using the iris may be completed.

The electronic device 100 may transmit, to the financial company server 200, the authentication completion information indicating that the authentication using the iris is completed. Accordingly, the financial company server 200 may perform the procedure for executing the account transfer according to the request for financial services received from the electronic device 100.

The authentication process described above may be performed through an authentication application. To this end, the electronic device 100 may execute an authentication application when an authentication request is received from the financial company server 200. The electronic device 100 may download and install an authentication application from an application store.

The authentication application is an application provided by a biometrics information management server (not shown), and may provide various services such as biometrics information registration, biometrics information input request, biometrics information recognition, biometrics information matching determination, and the like, and may manage pre-registered biometrics information stored in the electronic device 100.

The biometrics information management server (not shown) may be a server that is separate from the financial company server 200 or included in the financial company server 200.

The financial application and the authentication application may be connected to each other and provide a service. The electronic device 100 may call another application through one application between the financial application and the authentication application, and execute the other application. In addition, the electronic device 100 may execute the financial application and the authentication application simultaneously, and may display and activate one of the financial application and the authentication application.

The financial application and the authentication application may be distributed as separate applications and installed in the electronic device 100 respectively, or distributed as one application to implement functions of each application through one application.

Amid recent increase of social crimes, it frequently happens for a user to transfer money to another person's account against of his or her will, due to threats, intimidation, coercion, or the like of the another person.

The electronic device 100 according to an embodiment of the disclosure may identify information on whether a user is in a threat situation when performing authentication for a financial service through biometrics information, and if the user is not in a threat situation, the electronic device 100 may proceed the authentication normally. However, if the user is in a threat situation, even if the biometrics information acquired for authentication matches the pre-stored biometrics information, the electronic device 100 may reject the authentication or perform fake authentication.

The electronic device 100 may acquire information on whether the user is in a threat situation from a learned model. The electronic device 100 may photograph a user performing authentication, acquire information from an image including the user or an image including a user and a background around the user, use the acquired information as the input data of the learned model, and acquire information on whether the user is in a threat situation.

The learned model may be built in consideration of an application field of the recognition model or computer performance of the device, and the like. For example, the learned model may be learned to decide (or estimate, determine) whether the user performing authentication is in a threat situation, by using information acquired from an image as input data.

The learned model may be a model based on a neural network. The learned model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. The learned model may include, for example, a neural network model or a deep learning model developed from a neural network model. In the deep learning model, a plurality of network nodes may be located at different depths (or layers), and communicate data according to a convolution connection relationship. Examples of the object recognition models may include, but are not limited to, deep neural network (DNN), recurrent neural network (RNN), bidirectional recurrent deep neural network (BRDNN).

In order to acquire information on whether the user is in a threat situation, the electronic device 100 may use an artificial intelligence (AI) agent. The AI agent is a dedicated program to provide an AI-based service and may be executed by a former general use processor (for example, CPU) or a separate AI-dedicated processor (for example, graphic processing unit (GPU), etc.). In particular, the AI agent may control various modules to be described later.

The AI agent may operate when the user performs the authentication for financial services. The AI agent may acquire an image through photographing, acquire information on whether the user is in a threat situation based on the information acquired from the image, and provide the information.

Meanwhile, the AI agent may be in a state in which the AI agent has been already executed before the authentication for the financial services is started. In this case, when the authentication for the financial service is performed, the AI agent of the electronic device 100 may acquire an image through photographing, acquire information on whether the user is in a threat situation based on the information acquired from the image, and provide the information. For example, when the AI agent is executed by the AI dedicated processor, a function of the electronic device 100 is executed by a general purpose processor before the user performs the authentication, and when input of the biometrics information for authentication is detected, the function of the electronic device 100 may be executed by the AI dedicated processor.

In addition, the AI intelligence agent may be in a standby state before authentication for financial services is started. The standby state is a state in which a predefined user input is received to control the operation timing of the AI agent. While the AI agent is in the standby state, when the input of the biometrics information for authentication of the financial service is detected, the electronic device 100 may execute the AI agent, perform photographing using the AI agent to acquire an image, acquire information on whether the user is in a threat situation based on the information acquired from the image, and provide the acquired information.

The AI agent may be in a terminated state before the authentication for the financial service is started. While the AI agent is terminated, if the input of the biometrics information for authentication of the financial services is detected, the electronic device 100 may execute the AI agent, perform photographing using the AI agent to acquire an image, acquire information on whether the user is in a threat situation based on the information acquired from the image, and provide the information.

The AI agent may control various devices or modules. This will be described in a greater detail later.

Figure 2A:
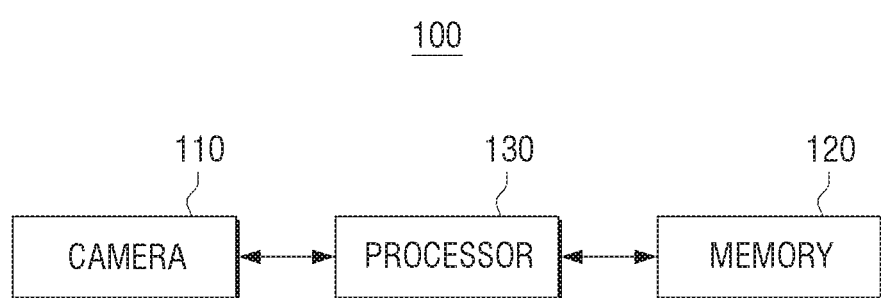
FIGS. 2A and 2B are block diagrams briefly illustrating a configuration of an electronic device according to various embodiments of the disclosure.

FIG. 2A is a block diagram briefly illustrating a configuration of an electronic device according to an embodiment of the disclosure.

FIG. 2A illustrates a block diagram of the electronic device 100 according to an embodiment of the disclosure.

Referring to FIG. 2A, the electronic device 100 includes a camera 110, a memory 120, and a processor 130. The configurations of FIG. 2A are examples to implement the embodiments of the disclosure, and hardware/software configurations which are obvious to those skilled in the art may be additionally included in the electronic device 100.

The camera 110 is a component for photographing (or capturing) an image. In this case, the electronic device 100 may include the camera 110 on the front and back sides of the electronic device 100, respectively. The processor 130 may use the camera 110 to photograph a user performing a financial service, a user and a background around the user.

The memory 120 may store instructions or data related to at least one other elements of the electronic device 100. In particular, the memory 120 may be implemented as a non-volatile memory, a volatile memory, a flash memory, a hard disk drive (HDD), or a solid state drive (SSD). The memory 120 is accessed by the processor 130, and the reading/recording/modification/deletion/update of the data can be performed by the processor 130. In this disclosure, the term memory may include the memory 120, the read-only memory (ROM) (not shown), random-access memory (RAM) (not shown) inside the processor 130, or the memory card (not shown) (for example, micro secure digital (SD) card, memory stick) mounted to the electronic device 100. In addition, the memory 120 may store a program and data to configure various screens to be displayed in a display (not shown) of the electronic device 100.

The memory 120 may store the AI agent for providing information on whether the user performing authentication for financial services is in a threat situation, and may store the learned model. The learned model may be a model that has been learned to determine whether a user is in a threat situation, with information acquired from an image including the user performing authentication for the financial services, a user and the background around the user as the input data.

Figure 2B:
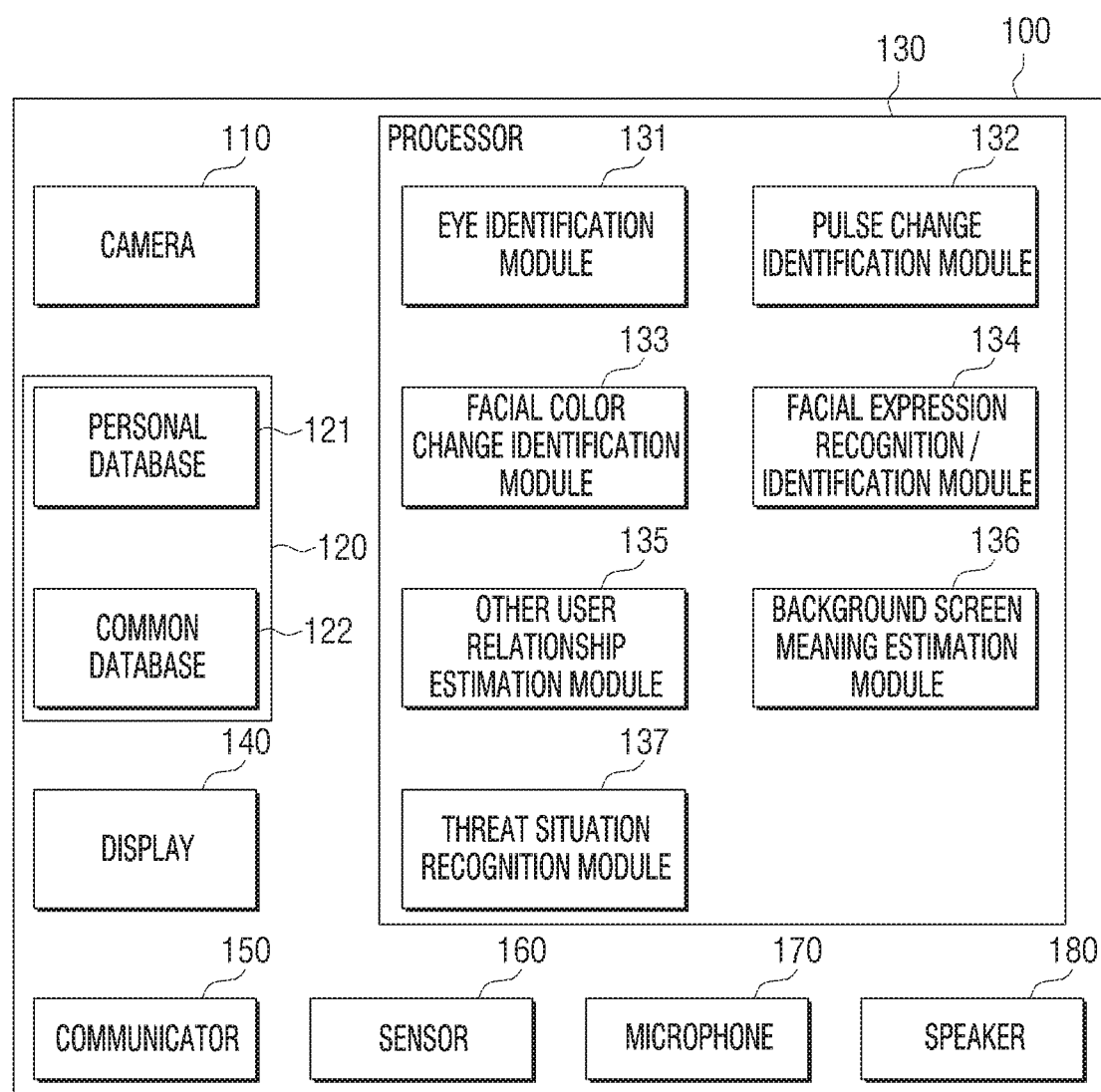

The memory 120 may store an eye identification module 131, a pulse change identification module 132, a facial color change identification module 133, a facial expression recognition/identification module 134, other user relationship estimation module 135, a background image meaning estimation module 136, a threat situation recognition module 137, and the like, as illustrated in FIG. 2B. Although the modules are separately illustrated in FIG. 2B, at least two modules may be implemented in combination.

The memory 120 may include a personal database 121 in which various information on the user's pulse rate, eye movement, facial color change, facial expression, and the like is stored, and a common database 122 in which various information on pulse rate, eye movement, facial color change, facial expression, and the like of a plurality of arbitrary users is stored, as illustrated in FIG. 2B.

The information stored in the databases 121 and 122 may be information on pulse rate, eye movement, facial color change, facial expression, and the like which appear when the user or a plurality of arbitrary users of the electronic device 100 perform financial services ordinarily.

The information stored in the personal database 121 may be measured and stored by the electronic device 100 whenever the user performs financial services. The information stored in the common database 122 may, when a plurality of arbitrary users proceed with financial services using their electronic devices, be measured by the electronic devices and provided to a server (not shown), and a server (not shown) may periodically transmit the corresponding information to the electronic device 100 to store the information in the common database 122 and update the information.

The processor 130 may be electrically connected to the camera 110 and the memory 120 and control overall operations and functions of the electronic device 100.

The processor 130 may perform authentication for the financial services based on biometrics information of the user performing authentication for the financial services.

The processor 130 may photograph the user performing the authentication through the camera 110 and acquire an image. The image may include the user or the user and the background around the user. The background may include not only the background around the user but also other persons who are present around the user.

While performing authentication for the financial services, the processor 130 may acquire information whether the user performing the authentication is present in a threat situation from the learned model, and perform authentication for the financial services according to the acquired information, with the information acquired from the image as input of the learned model.

Accordingly, when the processor 130 acquires, from the learned model, information indicating that the user is not in a threat situation (i.e., information that authentication corresponds to normal authentication), the processor 130 may perform authentication for financial service based on biometrics information. However, when the processor 130 acquires information indicating that the user is in a threat situation from the learned model (i.e., information indicating that the authentication corresponds to abnormal authentication), the processor 130 may reject the authentication for the financial services or perform the fake authentication.

The detailed description of the processor 130 will be described later with FIG. 2B.

FIG. 2B illustrates a block diagram of the electronic device 100 according to an embodiment of the disclosure.

Referring to FIG. 2B, the electronic device 100 includes the camera 110, the memory 120, the processor 130, a display 140, a communicator 150, a sensor 160, a microphone 170, a speaker 180. The camera 110, the memory 120, and the processor 130 will not be described in detail with respect to portions overlapping with those described in FIG. 2A.

The display 140 may display various screens. In particular, the display 140 may display a screen for the financial services. The financial services may include various finance-related services such as account transfer, remittance, deposit, and the like. The screen for the financial services may receive financial information such as an identity document (ID)/password, a withdrawal account number, a withdrawal account password, a deposit account number, an account transfer amount, and the like, which are required for the financial services, and may include a screen related to various financial services provided therethrough.

To this end, the display 140 may be implemented as a display such as a liquid crystal display (LCD), an organic light emitting diodes (OLED), or the like. In addition, the display 140 may be implemented as a touch screen having a layer structure in combination with the touch panel. The touch screen not only has a display function but also has a function of detecting a touch input position and a touch area as well as a touch input pressure. In addition, the touch screen may have a function of detecting not only a real touch but also a proximity touch.

The processor 130 may display a screen for the financial services on the display 140. When a user input for executing the financial application installed in the electronic device 100 is received, the processor 130 may execute the application and display a screen for the financial service on the display 140. In this case, the user input may be a user command for touching an icon corresponding to the financial application displayed on the display 140.

The processor 130 may provide the user with the financial service based on information which is input through the screen for the financial service.

The electronic device 100 may include the communicator 150 for communicating with the financial company server (200 of FIG. 1) which provides the financial service, and the communicator 150 may be electrically connected to the processor 130.

For example, when the financial information such as the withdrawal account number, the withdrawal account password, the deposit account number, and the account transfer amount is inputted and the user input for executing the account transfer is inputted, the processor 130 may transmit the financial service request including the input financial information to the financial company server 200 through the communicator 150.

The processor 130 may perform authentication through the biometrics information. The biometrics information may include information of at least one of a voice, face, iris, or fingerprint.

For example, when the request for the financial service is received from the electronic device 100, the financial company server 200 may request authentication to the electronic device 100, prior to proceeding with the financial service procedure according to the request for the financial service.

When the authentication request is received from the financial company server 200 through the communicator 150, the processor 130 may perform authentication based on the biometrics information. However, the processor 130 may perform the authentication for the financial service even if the authentication request is not received from the financial company server 200. The processor 130 may acquire the biometrics information of the user, compare the acquired biometrics information with the biometrics information pre-registered in the electronic device 100 to determine whether they match with each other, and if it is confirmed that the biometrics information match with each other, the authentication using the biometrics information may be completed.

In this case, the processor 130 may perform authentication using the pre-set biometrics information. The processor 130 may acquire the biometrics information using a means predetermined by the user from among a plurality of means (for example, voice, face, iris, and fingerprint, and combination of at least two of them) available for the authentication, and perform authentication using the acquired biometrics information.

For example, if a voice is set as a means for authentication, the processor 130 may receive a voice of the user performing authentication through the microphone 170, compare the information on the received voice with the voice information pre-registered in the electronic device 100, and perform authentication depending on whether they match with each other.

As another example, when the iris or face is set as the means for authentication, the processor 130 may acquire an image by photographing the user performing authentication via the camera 110, compare the iris information or the face information of the user acquired from the image with the iris information and face information pre-registered in the electronic device 100, and perform the authentication depending on whether they match with each other.

As another example, when the fingerprint is set as the means for the authentication, the processor 130 may read an image of the fingerprint from the finger of the user touching the button 20 through the fingerprint recognition sensor provided in the button (20 of FIG. 1) of the electronic device 100 to acquire the fingerprint, compare the feature values of the acquired fingerprint with the values pre-registered in the electronic device 100, and perform the authentication depending on whether they match with each other.

The means that will be used for the authentication may be set by the user.

Figure 3:
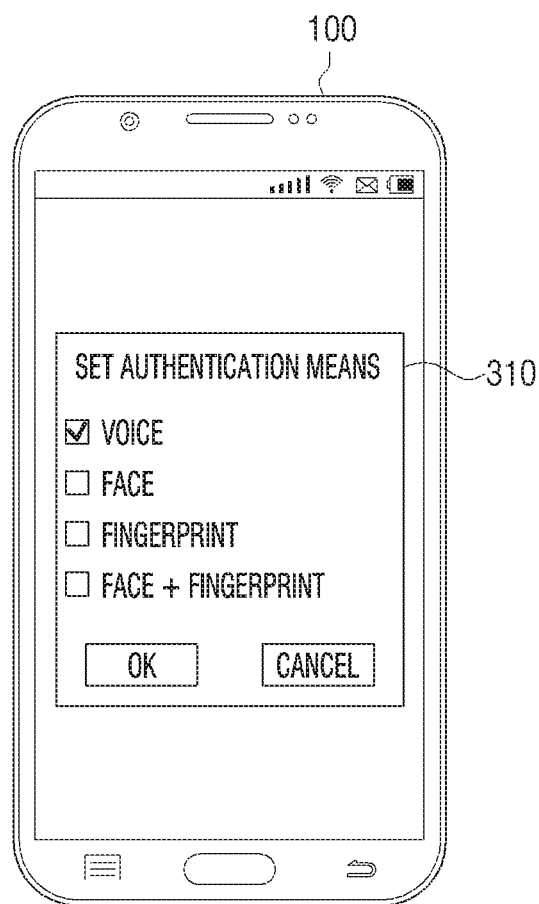
FIG. 3 is a view provided to describe an authentication method according to an embodiment of the disclosure.

FIG. 3 is a view provided to describe an authentication method according to various embodiments of the disclosure.

Referring to FIG. 3, the processor 130 may display a UI 310 for setting the authentication means and set the authentication means selected by the user, from among the authentication means displayed on the UI 310, as the authentication means for the financial service.

When the biometrics information matches the pre-registered biometrics information, the processor 130 may transmit, to the financial company server 200, the authentication completion information indicating that the authentication using the biometrics information is completed. The financial company server 200 may perform the procedure for executing the financial service according to the request for the financial service of the financial company received from the electronic device 100.

When the biometrics information do not match, the processor 130 may receive the biometrics information repeatedly up to a preset number of times (e.g., three times or five times). The processor 130 may determine whether the repeatedly received biometrics information matches the biometrics information pre-registered in the electronic device 100, and if they still do not match with each other, the processor 130 may transmit, to the financial company server 200, the authentication incompletion information indicating that the authentication is not performed normally. In this case, the financial company server 200 may stop the financial service. The financial company server 200 may stop the financial service even in a case where the authentication completion information is not received within a predetermined time from the electronic device 100, after authentication is requested to the electronic device 100.

The processor 130 may identify whether the user performing the authentication is in a threat situation, when performing the authentication for the financial service.

When the user is not in a threat situation, the processor 130 may proceed with the authentication process normally, but when the user is in a threat situation, the processor 130 may stop the authentication procedure or perform fake authentication.

The processor 130 may photograph the user through the camera 110 and acquire an image when performing authentication for the financial service. In this case, the image may include the user or the user and the background around the user. The background may include not only the background around the user but also other persons who are around the user.

In this case, the processor 130 may acquire only one image by photographing once, or acquire a plurality of images by photographing a plurality of times in a predetermined time interval.

The processor 130 may perform photographing according to means which are set for the biometrics authentication.

To be specific, when the face or iris is used as the means for authentication, the user is photographed through the camera 110 to acquire information on the face or iris. In this case, the processor 130 may use the acquired image to acquire biometrics information without separate photographing.

If voice or fingerprint are used as the means for authentication, the processor 130 may additionally photograph the user through the camera 110 and acquire an image, in addition to acquiring the biometrics information.

The processor 130 may acquire, from the learned model, information on whether the user performing the authentication for the financial service is in a threat situation, by using the information acquired from the image as the input of the learned model.

The learned model is a recognition model based on neural network or deep learning. The model may be a model that is learned to determine whether the user performing the authentication is in a threat situation by using the information acquired from the image as the input data.

When an image is input, the eye identification module 131 may detect eyes (that is, pupil or iris) from the image, and determine a movement of the detected eyes. For example, the eye identification module 131 may determine a degree of movement of eyes.

In addition, when the image is input, the eye identification module 131 may detect the user's eyes from the image and determine capillary vessel patterns in the white pupil or capillary vessel patterns in the pupil of the detected eyes.

Further, when the image is input, the pulse change identification module 132 may detect the color of the user's face in the image, determine the change in brightness of the detected facial color (i.e., skin tone), and based on the determined brightness change, determine a change in the pulse. For example, the pulse change identification module 132 may determine the degree to which a user's pulse changes.

Further, when the image is input, the facial color change identification module 133 may detect the face of the user in the image and determine the color change of the detected face. For example, the facial color change identification module 133 may determine the degree to which the user's facial color changes.

When the image is input, the facial expression recognition/identification module 134 may detect the face of a user and another person included in the image, analyze facial patterns such as eyebrows and eye tails from the detected face, and determine the facial expression. For example, the facial expression recognition/identification module 134 may determine facial expressions (e.g., anxious or irritated facial expression, frightened facial expression, threatened or angry facial expression, or the like) of the user or other persons.

The other user relationship estimation module 135, when an image is input, may detect at least one other persons around the user from the image, and determine a relationship between the user and the other persons.

In this case, the other user relationship estimation module 135 may analyze a photo stored in the electronic device 100 or a photo uploaded to a user's social network service (SNS) account to determine a relationship between the user and other persons. For example, if the other person included in the image is present in the photo stored in the electronic device 100 or in a photo uploaded to the user's SNS account, the other user relationship estimation module 135 may determine that the user has relevance with the other persons, and if the other persons included in the image are not present in the photo uploaded to the SNS account of the user, may determine that the user has no relevance with the other persons.

These modules may identify the user related to the facial information by using the image as input data of the learned face recognition model, and estimate the user's feature information including the user's eye movement, facial color change, and pulse rate change according to the facial color change, expressions, or the like. The learned face recognition model may be, for example, a neural network or a deep learning based recognition model.

In addition, the background image meaning estimation module 136 may determine a background space through the surrounding background included in the image when the image is received. For example, the background image meaning estimation module 136 may use the color and tone of the image of the area around the user and the position information acquired from a global positioning system (GPS) sensor (not shown) of the sensor 160, to estimate a place where the user is present. In this case, the background image meaning estimation module 136 may estimate the place of the user using the image and the position information about the area around the user as input data of the learned model. The model may be a model which is learned by using the image of various places and the location information of the place as learning data.

The threat situation recognition module 137 may determine whether the user is in a threat situation based on information determined from the eye identification module 131, the pulse change identification module 132, the facial color change identification module 133, the facial expression recognition/identification module 134, the other user relationship estimation module 135, and the background image meaning estimation module 136.

The threat situation recognition module 137 may use a learned model. The learned model may determine whether the user is in a threat situation by using information on at least one of the movement of the user's eyes, pulse rate, facial color change, facial expression, relevance to other persons around the user, a place where the user is present, and the like, as input data.

In this case, the model is a model learned to determine whether the user is in a threat situation by using the information as the input data. For example, the model may be a recognition model based on a neural network or deep learning.

For example, if the user's pulse rate is constant and the user is making a calm expression and is present in the user's home, but there is no change in the user's eyes or face color, the threat situation recognition module 137 may determine that the user is in a threat situation, as a result of applying the information to the learned model. This is because, in the case where there is no change in the eyes or the face color of the user, it may be possible that the biometrics authentication is performed by falsified means such as a photo, instead of an actual user.

As another example, if the user's pulse rate is constant and the user is making a calm facial expression, but the capillary blood vessel pattern and retinal capillary pattern do not match the capillary pattern of the user, the threat situation recognition module 137 may determine that the user is in a threat situation as a result of applying the information to the learned model, as it may be possible that a person other than the user performs authentication using the user's biometrics information without permission.

As another example, when there is a change in eyes or facial color of the user and the pulse rate of the user changes significantly, the threat situation recognition module 137 may determine that the user is in a threat situation as a result of applying the information to the learned model. Significant changes in the pulse rate of the user may be attributable to the situation that the user performs the financial service with nervousness or in an urgent situation.

As another example, if the user's eyes, face color, and pulse rate do not change significantly and the user is making a frightened facial expression, the threat situation recognition module 137 may determine that the user is in a threat situation, as a result of applying the information to the learned model. This is because the user making a frightened facial expression may mean that the user proceeds with financial services out of fear.

As another example, if the user's facial color and pulse rate do not change significantly and the user is making a calm facial expression, but the other person who does not have a relevance with the user is present in the vicinity of the user with a frightening expression, the threat situation recognition module 137 may determine that the user is in a threat situation as a result of applying the information to the learned model. This is because the presence of a person other than the user in a frightening facial expression around the user may mean that the user proceeds with the financial service by coercion and the like by the other person.

As another example, when the user is making a calm facial expression, but performs authentication at a place other than the place where the user has visited usually according to the location history information indicating the place where the user has visited usually, the threat situation recognition module 137 may determine that the user is in a threat situation as a result of applying the information to the learned model. This is because proceeding with the financial service by the user at a place where the user has not normally visited may mean that the user is brought to another place by kidnapping or coercion and proceeds with the financial service against his or her will.

The learned model may receive input of personalized information of the user and common information of a plurality of arbitrary users in relation to the pulse rate, eye movement, facial color change, facial expression, and determine whether the user is in a threat situation based on the personalized information, common information, and information acquired from the image.

The user's personalized information may include information stored in the personal database 121 and the common information for a plurality of arbitrary users may include information stored in the common database 122.

In this case, the threat situation recognition module 137 may additionally use information acquired from the personal database 121 and the common database 122 as the input data and determine whether the user is in the threat situation.

For example, if the user's pulse rate is significantly changed, but the change does not largely deviate from the degree of change at the time of performing the financial service at normal times, the threat situation recognition module 137 may determine that the user is not in a threat situation as a result of applying the information to the learned model. This is because the pulse rate of the user who performs the financial service changes significantly, but the change is also observed at normal times, so it appears that the user performs the financial service as usual.

The examples described above are merely exemplary, and the learned model may determine whether the user is in a threat situation or is not in a threat situation based on probability that is acquired by considering the input information in a comprehensive manner.

In the examples described above, it has been described that determining whether the user is in a threat situation is based on information acquired from an image, but this is merely exemplary. The processor 130, with various information other than the information acquired from an image as the input data of the learned model, may acquire information on whether the user is in a threat situation.

For example, in order to acquire information on whether a user is in a threat situation, the learned model may use a voice of the user, a voice of other persons around the user, a size of ambient noise, a message sending and receiving history, an application usage history, an authentication failure history, information received from other devices, user-related data stored in an external server (not shown) or a cloud server (not shown), and the like.

To do this, the processor 130 may control the element of the electronic device 100 to acquire the information when performing authentication for the financial service. For example, the processor 130 may acquire audio of the user or the ambient audio through the microphone 170, acquire various data related to an application from the memory 120, or receive various data from an external server (not shown) or a cloud server (not shown) through the communicator 150.

In this case, the learned model is a model that is learned to determine whether the user is in a threat situation by using the corresponding information as input data, for example, the model may be a recognition model based on a neural network or deep learning.

For example, although the user's pulse rate does not change significantly and the user makes a calm expression, the user's voice acquired through the microphone 170 may have voice characteristics in an anxious or nervous condition, or when the voice of persons other than the user have a voice characteristic in a threatening state or an angry state, or the ambient noise is excessively greater than a preset threshold value, the threat situation recognition module 137 may determine that the user is in a dangerous situation.

In this case, the determination as to whether the voice included in the audio is the user's voice may be performed by the learned model using the user's voice as the learning data, or by analyzing the user's voice pre-acquired through a telephone call or the like, determining the voice characteristics such as a tone, frequency, rhythm, dynamics of the user's voice, and storing the voice characteristics in advance, the user's voice may be identified according to whether the pre-stored voice characteristic matches the voice characteristic included in the audio.

As another example, if the user is making a calm facial expression and the user is in the usual place, for example, at home, while performing the financial service, but if the authentication for the financial service is failed more than a predetermined number of times, money is transferred to an account without account transfer history, a deposit account number which is input for the financial service is an account number which has been used for voice phishing or the like, the account transfer has been carried out by the user to a deposit account number that has not been used for account transfer within a predetermined period through a financial service application, or the account transfer has been made to a person who has no relevance with the user, the threat situation recognition module 137 may determine that the user is in a threat situation, as a result of applying the information to the learned model.

As another example, if the user is making a calm facial expression and the eyes move at the same level as usual, but the pulse rate received from another device connected to the electronic device 100 (for example, a wearable device) is significantly changed, the threat situation recognition module 137 may determine that the user is in a threat situation as a result of applying the information to the learned model.

As another example, if the user's pulse rate is similar to the normal pulse rate and the user is making a calm expression, but the phone number the user made the call through the phone application before the authentication is not a number pre-stored in the contact information, a user or the other party utters specific voice (for example, a voice or abuses requesting money) during the call performed before the authentication, or before the user performs the authentication, if the phone number to which the user sent a message or from which the user received a message is a phone number that has not been pre-stored in the contact information, if the message that is sent or received includes a specific word (such as a word or abuses requesting money), or prior to performing the authentication, if a posting is uploaded to an account which has no relevance with the user with respect to the user account of the SNS application, of the posting or the posting uploaded by the user includes a specific word (e.g., a word or abuses requesting money), the threat situation recognition module 137 may determine that the user is in a threat situation, as a result of applying the information to the learned model.

In this case, the threat situation recognition module 137 may apply the information on the entire use history of the user received from an external server (not shown) (e.g., the financial company server 200, or the SNS server (not shown) providing the SNS server) for managing the application to the learned model to determine whether the user is in a threat situation.

When the user executes a financial application or an SNS application, only a part of the entire usage histories for the application may be stored in the electronic device 100, and the entire usage history may be stored in an external server (not shown). Therefore, the threat situation recognition module 137 may receive information on the entire usage history of the user for the application from an external server (not shown), apply the information to the learned model, and determine whether the user is in a threat situation.

Similarly, the threat situation recognition module 137 may receive various information uploaded to the cloud server (not shown) by the user, apply the information to the learned model, and determine whether the user is in a threat situation.

The above-described examples are merely exemplary for convenience of description. The learned model may determine whether the user is in a threat situation or not based on the probability acquired by considering the inputted information in a comprehensive manner.

As described above, the processor 130 may perform authentication using preset biometrics information. For example, the processor 130 may perform authentication for the financial service using predetermined specific biometrics information from among the user's voice, face, fingerprint, and combination of the face and fingerprint.

In this case, different security levels may be set for a plurality of means which may be used for authentication. For example, the lowest security level may be set for the voice, the next highest security level may be set for the face, the next highest security level may be set for the fingerprint, and the highest security level may be set for the combination of the fingerprint and the face. A high security level may be set in the order of voice→face→fingerprint→fingerprint+face.

In this case, the threat situation recognition module 137 may use the information on the means set for the authentication as input data of the learned model.

Accordingly, the learned model may determine whether the user is in a threat situation in consideration of the security level of the authentication means. The model may be a learned model to determine whether the user is in a threat situation according to the security level of the authentication means.

For example, when authentication for the financial service is performed through the user's voice, the learned model may determine that the user is in a threat situation. When authentication is performed through the voice which is set to the lowest security level, the learned model may not consider other input information and determine that the user is in a threat situation.

Whether to determine a threat situation in consideration of the authentication means and a security level for the authentication means may be set by the user.

Figure 4A:
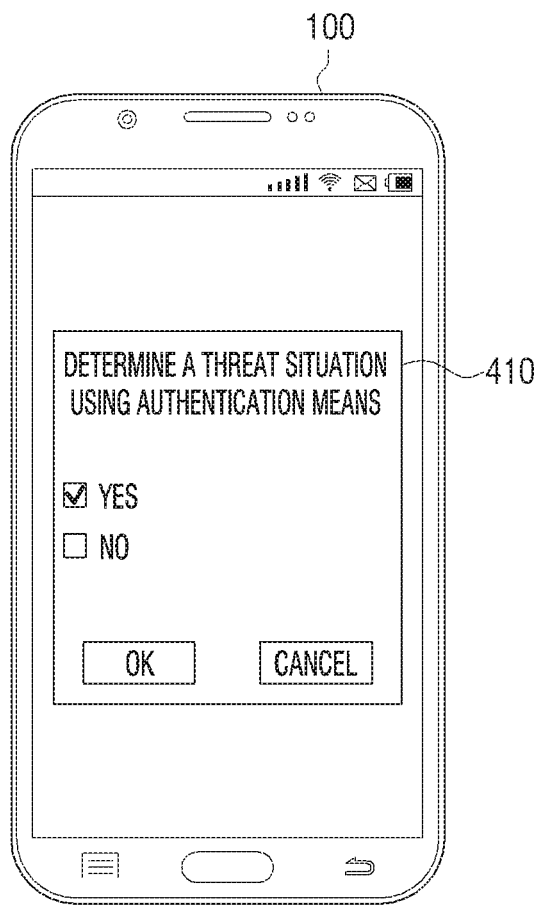
FIGS. 4A and 4B are views provided to describe an authentication method according to an embodiment of the disclosure.
Figure 4B:
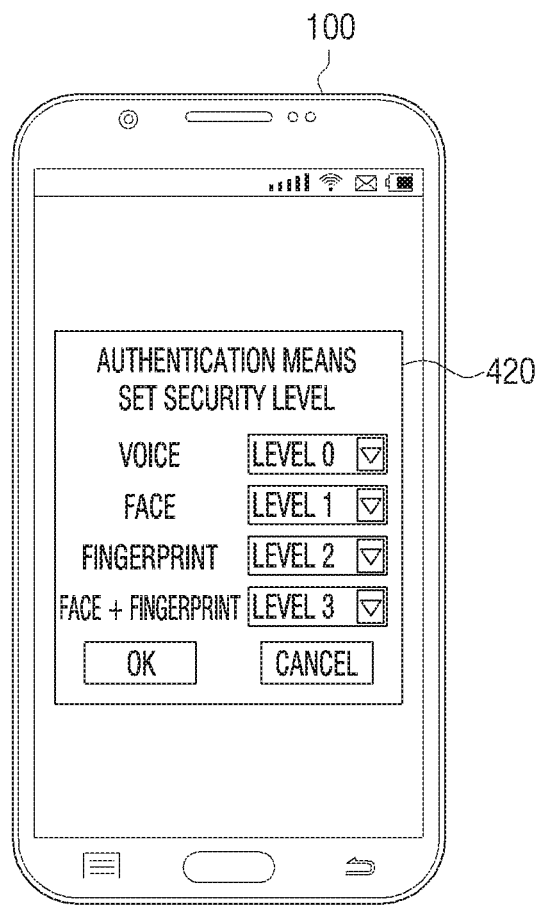

FIGS. 4A and 4B are views provided to describe an authentication method according to an embodiment of the disclosure.

Referring to FIG. 4A, the processor 130 may display a UI 410 for setting whether the authentication means is to be used for determining a threat situation, and the processor 130 may determine whether a threat situation is to be determined in consideration of the authentication means based on the user input command that is input through the UI 410.

Referring to FIG. 4B, the processor 130 may display a UI 420 for setting a security level of the authentication means and set a security level for the authentication means based on a user command that is input through the UI 420.

In consideration of a gesture (or a posture) of the user performing authentication, whether the user is in a threat situation may be determined.

The threat situation recognition module 137 may use information on the gesture of the user performing authentication as the input data of the learned model. The learned model may determine whether the user is present in a threat situation in consideration of the gesture taken by the user performing the authentication. The model may be a learned model to determine whether the user is in a threat situation according to a gesture taken by the user performing authentication.

For this purpose, the processor 130 may acquire information on the gesture taken by the user from, for example, an image of the user performing authentication, or, when authentication for the financial service is performed through the fingerprint, acquire information on the gesture taken by the user from the fingerprint image acquired by the recognition sensor.

For example, the learned model may be a model in which the user takes a specific gesture (e.g., a gesture of wink or a gesture of turning a face by a certain angle) through the face of the user, or a gesture (for example, a gesture of touching a button and rotating the finger in a specific direction) through the finger during recognition of the finger, it may be determined that the user is in in a threat situation.

The learned model, when the user takes a specific gesture through the face or the finger, may determine that the user is in a threat situation, without considering other input information.

In the above example, the learned model determines that the user is in a threat situation, when the user takes a specific gesture, but this is only an example. The learned model may determine that the user is not in a threat situation if the user takes a specific gesture.

Whether to determine a threat situation considering the user's gesture and types of gesture may be set by the user.

Figure 5A:
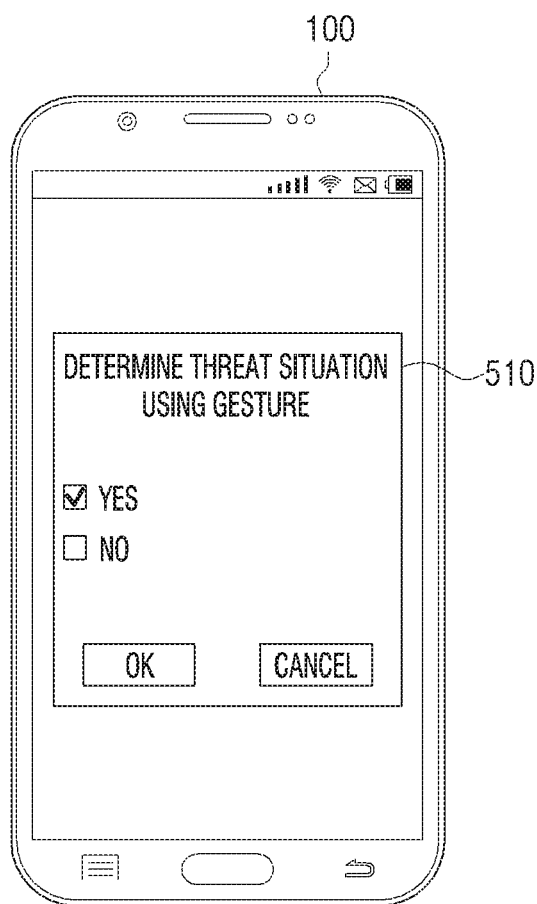
FIGS. 5A and 5B are views provided to describe an authentication method according to various embodiments of the disclosure.
Figure 5B:
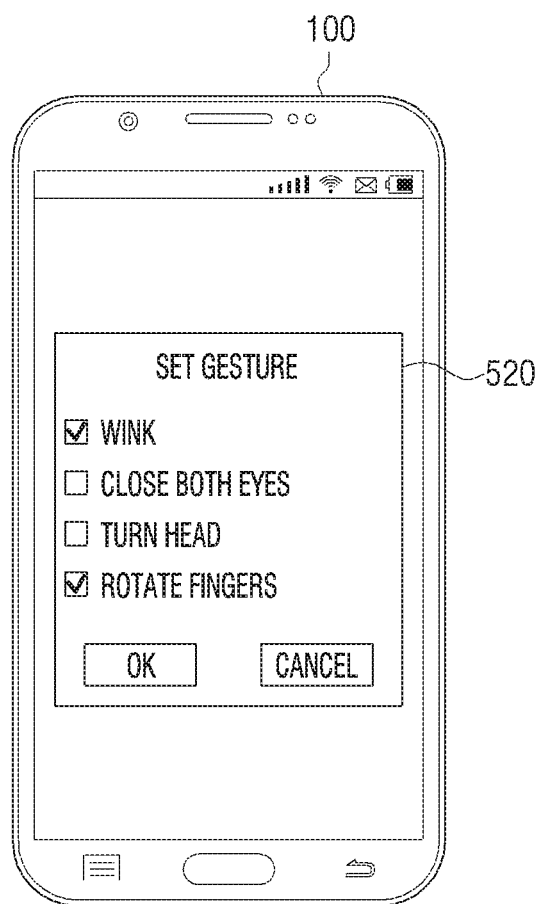

FIGS. 5A and 5B are views provided to describe an authentication method according to an embodiment of the disclosure.

Referring to FIG. 5A, the processor 130 may display a UI 510 for setting whether to use a gesture for determining a threat situation, and determine a threat situation by considering a gesture based on the user command input through the UI 510.

Referring to FIG. 5B, the processor 130 may display a UI 520 for setting a type of gesture to be considered for a threat situation, and set a type of gesture based on the user command input through the UI 520.

In consideration of specific information (for example, position information or time information), whether the user is in a threat situation may be determined. For example, the learned model may determine that the user is in a threat situation when the authentication is performed at a specific place or at a specific time, or conversely, that the user is not in a threat situation. In this case, the specific information may be set by the user.

In the above example, the threat situation recognition module 137 determine whether the user is in a threat situation using the learned model.

According to various embodiments of the disclosure, the threat situation recognition module 137 may determine whether the user is in a threat situation through a basis of rules. Based on the information acquired from an image photographing the user performing the financial service, the voice of the user, the voice of another person around the user, the size of the ambient noise, the call history, the message sending and receiving history, application use history, information received from another device, user related data stored in an external server or a could server, and the like, the threat situation recognition module 137 may determine that the user is in a threat situation, if the acquired information satisfies a specific condition according to pre-determined rules.

For example, if there is a rule to determine that the user is in a threat situation, when the user is making a frightened facial expression, the threat situation recognition module 137 may determine that the use is in a threat situation according to the preset rule, when the user is making a frightened facial expression according to the information acquired from the image of the user.

As described above, according to various embodiments of the disclosure, it may be determined whether the user performing the financial service is in a threat situation.

When the processor 130 acquires information that the user is not in a threat situation from the learned model, the processor may perform authentication for the financial service based on the biometrics information. The processor 130 may compare the biometrics information acquired from the user with the biometrics information pre-registered in the electronic device 100 at the time of authentication for the financial service, determine whether the biometrics information matches the pre-registered biometrics information in the electronic device 100, and if it is determined that the biometrics information matches, the processor 130 may send the authentication completion information indicating that the authentication using the biometrics information is completed to the financial company server 200 through the communicator 150. However, if the biometrics information does not match, the processor 130 may repeatedly receive the biometrics information for a predetermined number of times (e.g., three times or five times).

Accordingly, the financial company server 200 may perform a procedure of performing the financial service according to the request for financial services of the financial company received from the electronic device 100.

When the financial service is completed according to normal authentication, the processor 130 may provide a UI indicating that the financial service is performed normally.

Figure 6A:
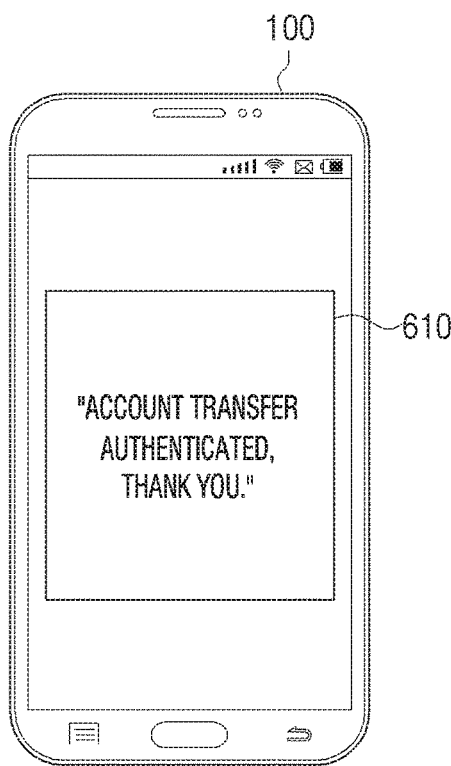
FIGS. 6A, 6B, and 6C are views provided to describe an authentication method according to various embodiments of the disclosure.
Figure 6B:
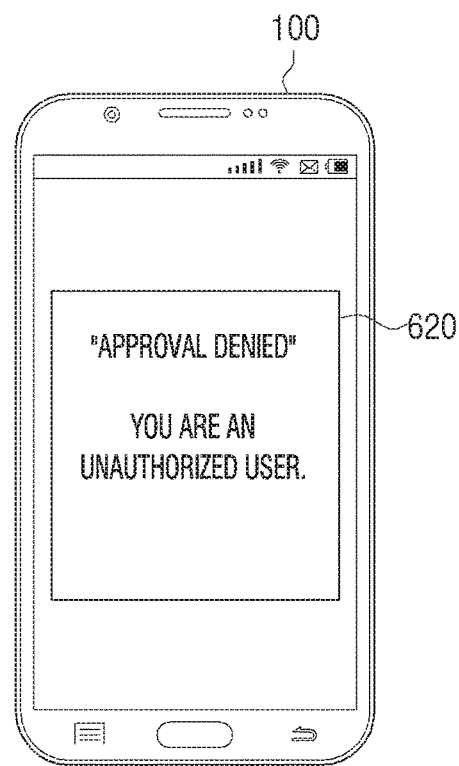
Figure 6C:
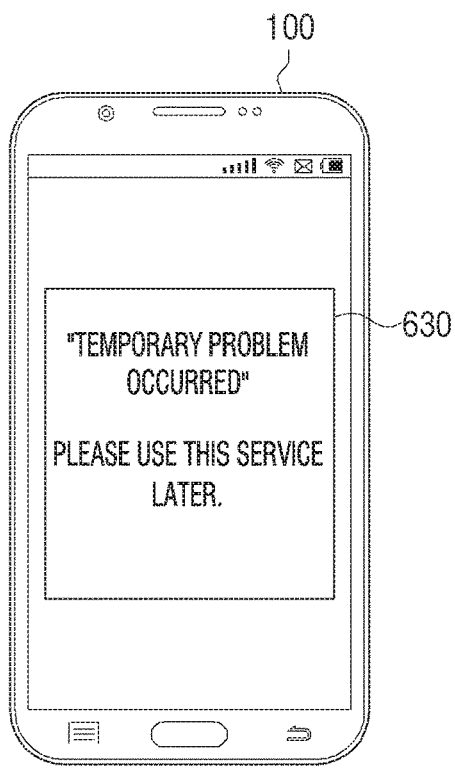

FIGS. 6A to 6C are views provided to describe an authentication method according to an embodiment of the disclosure.

Referring to FIG. 6A, the processor 130 may display on the display 140 a UI 610 including a text such as "Account transfer authenticated, thank you".

The processor 130, when acquiring information that the user is in a threat situation from the learned model, may reject authentication for the financial service or perform the fake authentication. When the processor 130 acquires information indicating that the user is in a threat situation from the learned model, even if the biometrics information acquired from the user during the authentication for the financial service matches the biometrics information pre-registered in the electronic device 100, the processor 130 may reject authentication for the financial service or perform fake authentication.

First, when rejecting the authentication for the financial service, the processor 130 may transmit, to the financial company server 200, the authentication incompletion information indicating that the authentication is not normally performed, and provide a UI indicating that the financial service is rejected. Referring to FIG. 6B, the processor 130 may display a UI 620 including a text "Approval denied. You are an unauthorized user" on the display 140.

The fake authentication refers to false authentication in which the authentication appears to be normally performed but, actually, the financial service is not normally performed. This takes into account the fact that the user who is in a dangerous situation is highly likely to be with a person who threatens the user.

When performing the fake authentication, the processor 130 may provide a UI indicating that there is a problem with a financial company or the like and thus the financial service may not be normally performed. In this case, the processor 130 may not transmit the authentication completion information to the financial company server 200 even if the biometrics information matches the pre-stored biometrics information. For example, referring to FIG. 6C, the processor 130 may display a UI 630 including a text "Temporary problem occurred, Please use this service later" on the display 140.

When performing the fake authentication, the processor 130 may provide a UI (for example, FIG. 6A) indicating that the financial service is performed normally, but may transmit, to the financial company server 200, a request to lock the transaction account in which the financial service is performed through the communicator 150.

The processor 130 may transmit the authentication completion information to the financial company server 200 as the biometrics information matches the pre-stored biometrics information. At this time, a request for lock the transaction account in which the financial service is proceeded may be transmitted to the financial company server 200. The financial company server 200 may prevent the deposit and withdrawal of the account from being performed for a predetermined time period in accordance with the request for lock.

When the user is in a threat situation, the processor 130 may perform an emergency call using a preset contact information. The contact information of the other party of the emergency call may be set by the user, and the contact information of a police or a security agency and so on may be set by default.

In this case, the processor 130 may transmit the audio around the user acquired via the microphone 170 to the other party subject to the emergency call, and may also transmit the predetermined voice message to the other party subject to emergency call. The predetermined voice message may include a voice message for informing that the user is currently in a dangerous situation or the user's current location information. The processor 130 may proceed with an emergency call connection as the background, and the authentication performed by the user as the fake authentication.

The communicator 150 may communicate with various types of external devices or external servers based on various types of communication methods. For example, the communicator 150 may communicate with an external device such as a wearable device (not shown), and may communicate with a server such as the financial company server 200, a SNS server (not shown).

The communicator 150 may include one or modules capable of wireless communication between the electronic device 100 and the communication system (e.g., mobile communication system), between the electronic device 100 and another electronic device, or between the electronic device 100 and an external server. In addition, the communicator 150 may include at least one modules for connecting the electronic device 100 to one or more networks.

The communicator 150 may include at least one of a broadcast receiving chip (not shown), a wireless communication chip (not shown), or a near field communication chip (not shown). The processor 130 may communicate with an external device or an external server using the communicator 150.

The sensor 160 may include one or more sensors for sensing at least one of the information inside the electronic device 100, the surrounding environment information of the electronic device 100, and use information.

For example, the sensor 160 may include at least one of a GPS sensor, a proximity sensor, an illumination sensor, a touch sensor, an acceleration sensor, a magnetic sensor, a gravitational sensor (G-sensor), a gyroscope sensor, a motion sensor, a red-green-blue (RGB) sensor, an infrared (IR) sensor, a finger scan sensor, an ultrasonic sensor, an optical sensor (e.g., a camera), a microphone, a battery gauge, an environmental sensor (e.g., a barometer, a hygrometer, a thermometer, a radiation detection sensor, a heat detector, a gas detection sensor, etc.), chemical sensors (e.g., electronic nose, a healthcare sensor, a biometric recognition sensor, etc.). The processor 130 may utilize the information detected by these sensors.

The microphone 170 is an element to acquire audio. The processor 130 may acquire audio generated from the user and the surroundings of the user using the microphone 170.

The speaker 180 may output audio. The speaker 180 may output voice of the other party to the call received by the electronic device 100 during the call.

In the above-described example, a method is described for protecting the user and an account of the user by acquiring information on whether the user is in a threat situation from the learned model, with various information on the user performing the financial service and the surrounding situation as the input data of the learned model, and proceeding with a proper process according to whether the user is in a threat situation.

The electronic device 100 may assign access right (or access control) in a different manner depending on a means of authentication the user uses for authentication. To do this, the electronic device 100 may have different access rights by authentication means. For example, it is assumed that the authentication means is the face, the fingerprint, and a combination of the face and the fingerprint. In this case, the lowest access right level is set on the face, the next highest access right level is set on the fingerprint, and the highest access right level may be set on the combination of the face and the fingerprint. A higher access right level may be set in the order of the face→the fingerprint→the face+the fingerprint.

This access right level may be set by the user. For example, the processor 130 may display, on the display 140, a UI for setting the level of access right for each authentication means, and the user may set a level for the access right of the authentication means.

The processor 130 may limit a function of the electronic device 100 or a function provided by the application installed in the electronic device 100.

The authentication may include authentication required for a specific function in the application (e.g., log-in for a financial application or authentication for a specific financial service provided in a financial application) and authentication for a specific function of the electronic device 100 (for example, authentication to unlock the electronic device 100, etc.).

To do this, the processor 130 may identify which means is used by the user for authentication. When authentication is performed, the processor 130 may receive biometrics information for authentication through the camera 110 or a fingerprint recognition sensor (not shown) of the sensor 160, compared the input biometrics information with pre-registered biometrics information to perform authentication, and identify the means by which authentication is performed.

For example, the processor 130 may detect the face from an image photographed through the camera 110, compare the detected face with the pre-stored face information, and if they match with each other, the processor 130 may identify that the user performs authentication via the face.

In another example, the processor 130 may acquire fingerprint information from the finger touched through the fingerprint recognition sensor, compare the acquired fingerprint information with the pre-stored fingerprint information, and if they match with each other, the processor 130 may identify that the user performs authentication via the fingerprint.

In another example, the processor 130 may detect the face from an image photographed through the camera 110, acquire fingerprint information from the finger touched through the fingerprint recognition sensor, compare the fingerprint information with the pre-stored face and fingerprint information, and if they match with each other, the processor 130 may identify that the user performs the authentication via the face and the fingerprint.

According to an access right level for the authentication means, the processor 130 may provide a function of the electronic device 100 or a function provided by an application in a limited manner When the access right level is the highest, the processor 130 may provide the function of the electronic device 100 or the functions provided by the application without a limit as in the normal case, but the lower the level of the access authority is, the more the functions provided by the electronic device 100 or the application may be provided in a hierarchically limited manner For example, it is assumed that the electronic device 100 which is in a locked state is unlocked.

FIGS. 7A to 7D are views provided to describe an authentication method according to an embodiment of the disclosure.

Figure 7A:
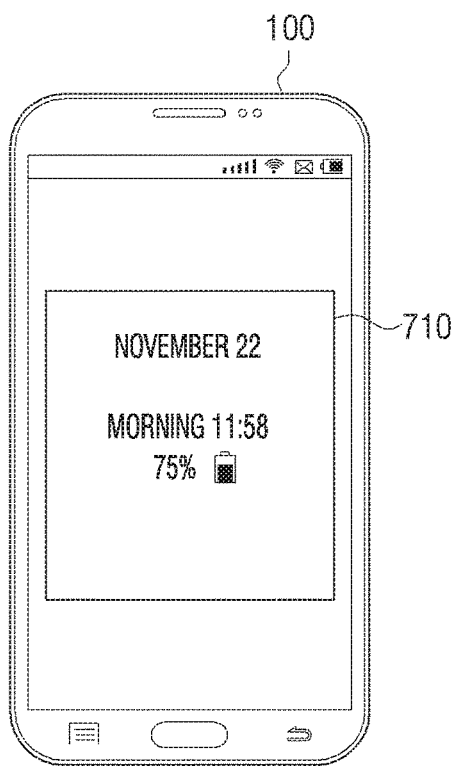
FIGS. 7A, 7B, 7C, and 7D are views provided to describe an authentication method according to various embodiments of the disclosure.

Referring to FIG. 7A, when the electronic device 100 is in a locked state, the processor 130 may display a lock screen 710 on the display 140. Information on a clock, date, remaining battery level, and the like may be displayed on a unlock screen.

While the lock screen is displayed, when the authentication to unlock is completed, the processor 130 may unlock the electronic device 100 and display a background screen including an icon indicating an application installed in the electronic device 100.

The processor 130 may limit an icon displayed on a background screen according to the authentication means.

Figure 7B:
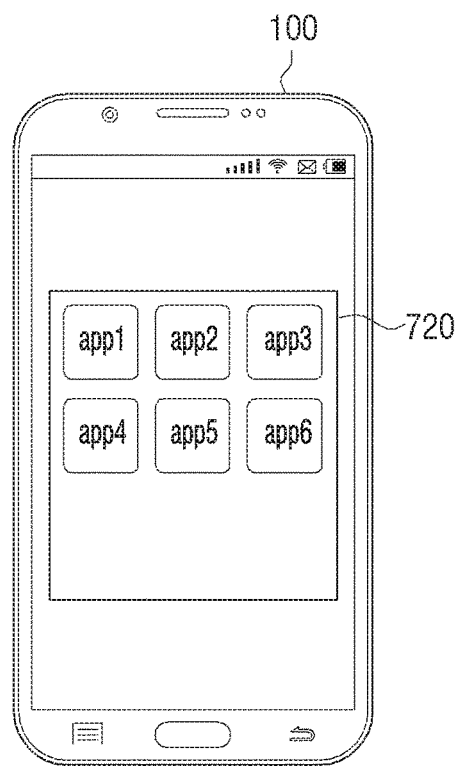

Referring to FIG. 7B, if authentication is performed through the combination of the face and the finger, which is the highest access right level, the processor 130 may display a screen 720 including icons (e.g., app1 to app6 of FIG. 7B) for all the applications installed in the electronic device 100 as usual.

Figure 7C:
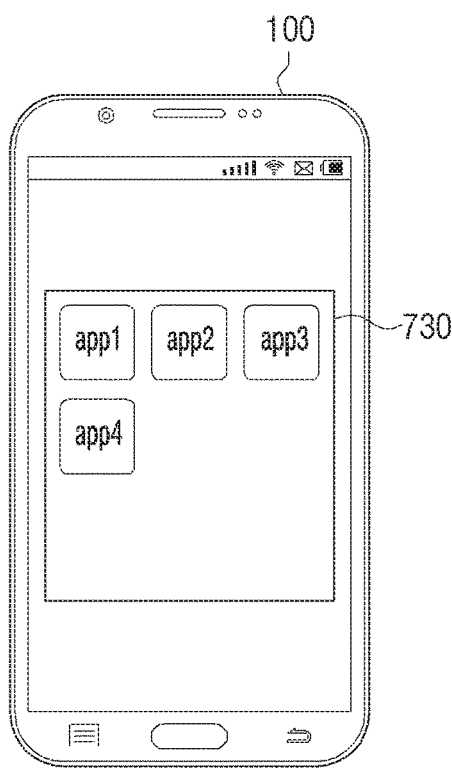

When the authentication is performed through the finger which has the next highest access right level, the processor 130 may not display icons (e.g., app5, app6) for some applications in a screen 730, from among the applications installed in the electronic device 100, as illustrated in FIG. 7C.

Figure 7D:
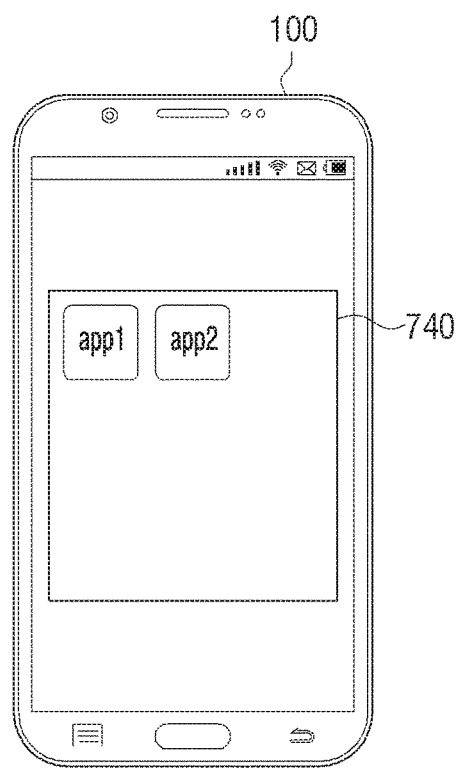

When the authentication is performed through the face which has the lowest access right level, more icons (e.g., app3 to app6) may not be displayed in a screen 740 than the case where the authentication is performed through the fingerprint, from among the applications installed in the electronic device 100, as illustrated in FIG. 7D.

As described above, the processor 130 may limit displayed icons according to the access right levels, and limit a user's access to an application according to the access right levels.

According to the access right levels, the lower the access right level, the more the display of the icons regarding the applications associated with private life or financial services may be limited.

For example, it may be assumed that a call application, a message application, a camera application, a photo application, an SNS application, and a financial application are installed. When authentication is performed through the means with the highest access right level, the processor 130 may display icons associated with the call application, the message application, the camera application, the photo application, the SNS application, and the financial application.

In addition, the processor 130 may display icons associated with the call application, the message application, and the camera application when authentication is performed through a means having the next highest access right level. That is, processor 130 may not display icons associated with the photo application, the SNS application, and the financial application.

In addition, when the authentication is performed through the means with the lowest access right level, the processor 130 may display an icon on the call application. The processor 130 may not display icons associated with other application except the call application.

This is merely exemplary, and an icon which is limitedly displayed according to access right levels may be set by a user.

According to various embodiments, the processor 130 may limit a function provided by the application, according to the authentication means.

For example, no matter which means is used for authentication, the processor 130 may display an icon on the financial application installed in the electronic device 100 on a background screen.

The processor 130 may limit a service provided by the financial application according to the access right levels of the authentication means.

Figure 8A:
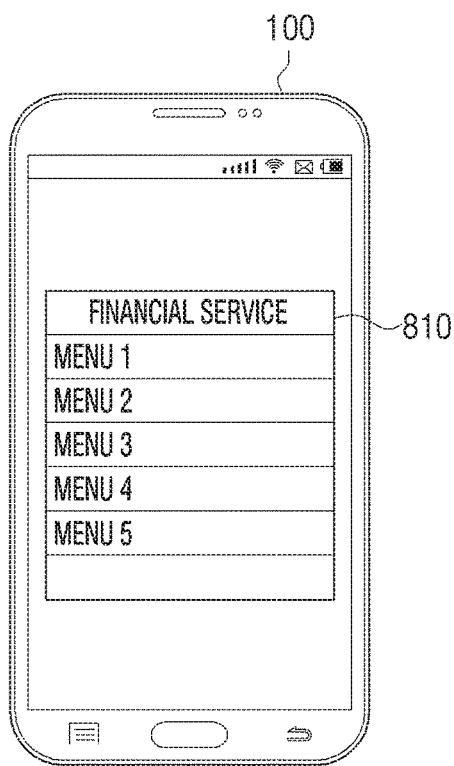
FIGS. 8A, 8B, and 8C are views provided to describe an authentication method according to various embodiments of the disclosure.
Figure 8B:
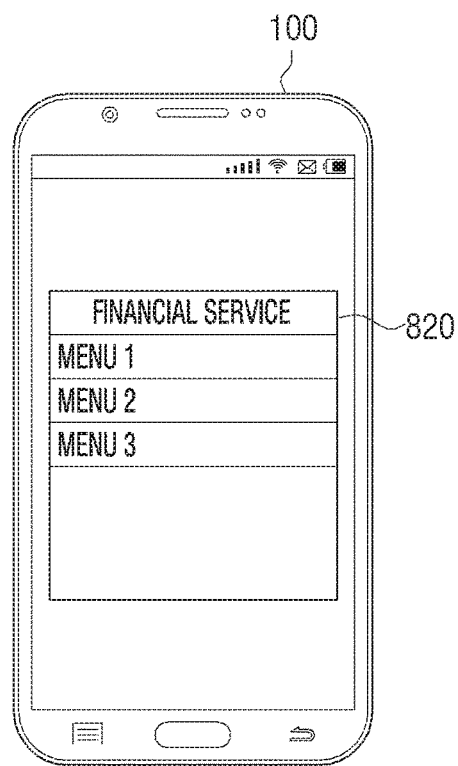
Figure 8C:
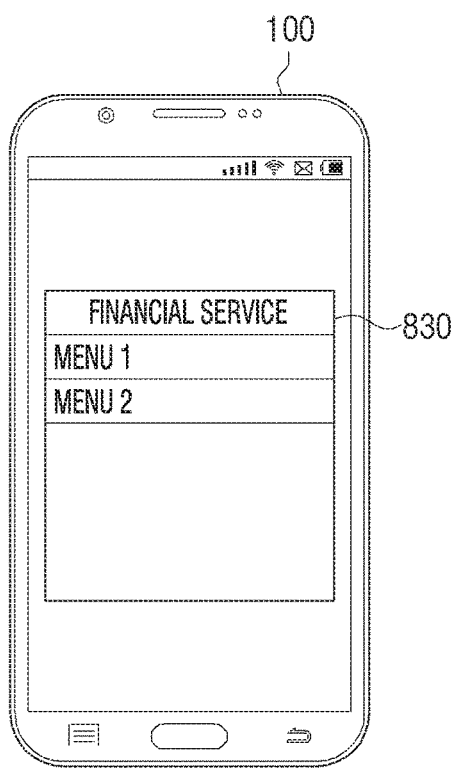

FIGS. 8A to 8C are views provided to describe an authentication method according to an embodiment of the disclosure.

Referring to FIG. 8A, when log-in to the financial application is performed through the combination of the face and the fingerprint which has the highest access right level, the processor 130 may provide all the services provided by the financial service. The processor 130 may display a UI 810 (menu 1 to menu 5) including menus for performing all the financial service provided by the financial application.

When log-in to the financial application is performed through the fingerprint which is the highest access right level, the processor 130 may limit a part of the services provided by the financial application. The processor 130 may display a UI 820 (menu 1 to menu 3) not including a menu on the limited services, from among the financial services provided by the financial application, as illustrated in FIG. 8B.

When log-in to the financial application is performed through the face which has the lowest access right level, the processor 130 may limit more services than the case in which log-in is performed by the fingerprint, from among the services provided by the financial application. The processor 130, as illustrated in FIG. 8C, may display a UI 830 (menu 1 and menu 2) not including a menu for the limited services from among the financial services provided by the financial application.

In this case, the limited service may be determined in accordance with an importance of the service.

For example, it is assumed that the account transfer service, the transaction history check service, the account balance inquiry service, and the revocation service are provided through the financial application.

When log-in to the financial application is performed through the combination of the face and the fingerprint which has the highest access right level, the processor 130 may provide an account transfer service, a transaction history check service, an account balance inquiry service, and a revocation service.

When log-in to the financial application is performed through the fingerprint which has a medium access right level, the processor 130 may limit the account transfer service and account balance inquiry service to protect the account of the user from other persons.

When log-in to the financial application is performed through the face which has the lowest access right level, the processor 130 may limit transaction history check service, in addition to account transfer service and account balance inquiry service. As such, in order to protect the user's account from other persons, the processor 130 may preferentially limit a service to transfer money in the account of the user or check balance of the account.

When the user performs authentication, the processor 130 may assign different access rights to authentication means, only when the user takes a specific gesture. The processor 130 may provide a function of the electronic device 100 or a function of the application in a limited manner only when the user makes a specific gesture (e.g., a gesture of wink or a gesture of turning a face by a certain angle) through the face of the user, or a gesture (e.g., a gesture of touching a button and rotating the finger in a specific direction) through the finger during recognition of the finger.

For example, when the electronic device 100 is unlocked through the fingerprint, it is assumed a case where the user touches a button without a specific gesture and then rotates the finger in a specific direction.

When the user does not make a specific gesture, the processor 130 may unlock the electronic device 100 and display icons on all the applications installed in the electronic device 100 on the background screen as usual.

When the user touches a button and rotates the finger in a specific direction, the processor 130 may not display an icon on some applications, from among the applications installed in the electronic device 100, according to the access right level which is set for the fingerprint.

Figure 9:
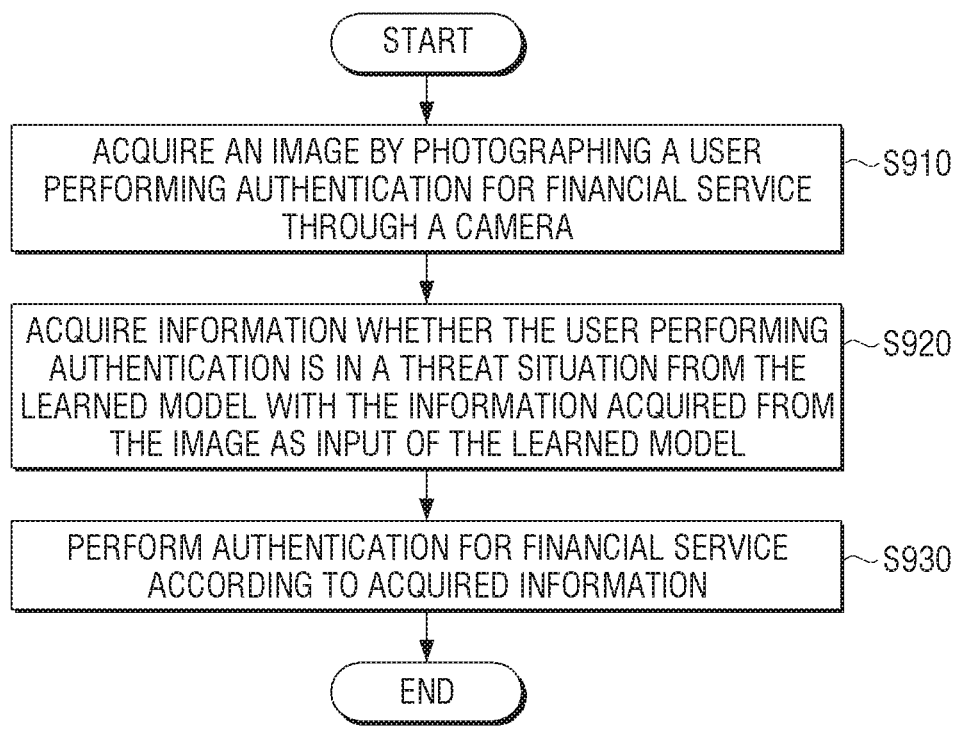
FIG. 9 is a flowchart to describe an authentication method according to an embodiment of the disclosure.

FIG. 9 is a flowchart to describe an authentication method according to an embodiment of the disclosure.

Referring to FIG. 9, by photographing a user performing authentication through a camera, an image is acquired at operation S910.

With the information acquired from the image as the input of the learned model, information on whether the user performing the authentication is in a threat situation is acquired at operation S920.

According to the acquired information, authentication on the financial service is performed at operation S930.

The learned model may determine whether a user is in a threat situation using information on at least one of the eye movement, pulse rate, facial color change, facial expression, a place where the user is present, or relevance with other persons around the user which are acquired from the image.

The learned model may receive personalized information on the user and the common information of the plurality of arbitrary users with respect to the pulse rate, eye movement, facial color change, facial expression, and determine whether the user is in a threat situation based on the personalized information, common information, and the information acquired from the image.

The biometrics information may include at least one of the voice, face, or fingerprint of the user.

The step of performing authentication may include performing authentication for the financial service using predetermined specific biometrics information from among the voice, face, fingerprint, and the combination of the face and fingerprint.

The learned model may determine that the user performing the authentication is in a threat situation, when the authentication for the financial service is performed through the voice of the user.

When the user takes a specific gesture through the user or the user takes a specific gesture through the finger when recognizing the finger, the user performing the authentication may be in a threat situation.

The performing authentication may include performing authentication for the financial service based on the biometrics information, when the user acquires information from the learned model that the user is not in a threat situation, and when the user acquires information that the user is in a threat situation, the authentication for the financial service may be rejected or fake authentication may be performed.

When performing the fake authentication, a UI indicating that the financial service is normally performed may be provided, and a request for lock the transaction account for which the financial service is made may be transmitted to the financial company server.

The detailed description of the authentication method has been described above.

The various embodiments of the disclosure may be implemented as software that includes instructions that may be stored in machine-readable storage media readable by a machine (e.g., a computer). A device may call instructions from a storage medium and that is operable in accordance with the called instructions, including an electronic apparatus (e.g., electronic device (A)). When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

The method according to the above-described embodiments may be provided as being included in a computer program product. The computer program product may be traded as a product between a seller and a consumer. The computer program product may be distributed online in the form of machine-readable storage media (e.g., compact disc ROM (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) of the elements mentioned above may include a single entity or a plurality of entities. At least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a memory configured to store a learned model comprising an artificial intelligent algorithm learned to determine whether a user performing authentication for a financial service is in a threat situation; and
a processor configured to:
perform authentication for the financial service based on biometrics information of the user performing authentication for the financial service,
while performing authentication for the financial service:
acquire an image by photographing the user performing authentication and a background around the user through the camera,
apply the image to the learned model to obtain information on an estimated relationship between the user and other users in the background around the user and information on a facial expression of the other users, and determine whether the user performing authentication is in a threat situation based on information on an estimated relationship between the user and other users in the background around the user and information on a facial expression of the other users acquired from the image, and perform authentication for the financial service according to the biometrics information, wherein the learned model is trained to identify a plurality of relationships related to the user using a plurality of pre-stored images related to the user, and based on the other users included in the image being identified, obtain the estimated relationship between the user and the other users from among the plurality of relationships, and wherein the processor is further configured to:

based on at least one pre-stored image including the other users being identified among the plurality of pre-stored images, obtain the estimated relationship based on the at least one pre-stored image, and determine that the user is not in a threat situation based on the estimated relationship, based on at least one pre-stored image including the other users not being identified among the plurality of pre-stored images, determine whether the user performing authentication is in a threat situation using the information on the facial expression of the other users, based on that the user is not in a threat situation, perform authentication for the financial service based on the biometrics information, and based on that the user is in a threat situation, reject the authentication for the financial service or perform fake authentication.

2. The electronic device of claim 1, wherein the learned model is further configured to determine whether the user is in a threat situation using information on at least one of a movement of the user's eyes, pulse rate, facial color change, facial expression, a place where the user is present.

3. The electronic device of claim 2, wherein the learned model is further configured to:

receive input of personalized information of the user and common information of a plurality of arbitrary users in relation to the pulse rate, eye movement, facial color change, and facial expression, and determine whether the user is in a threat situation based on the personalized information, the common information, and the information acquired from the image.

4. The electronic device of claim 1, wherein the biometrics information comprises at least one of a voice, a face, or a fingerprint of the user.

5. The electronic device of claim 1, wherein the processor is further configured to perform authentication for the financial service using predetermined specific biometrics information.

6. The electronic device of claim 5, wherein the predetermined specific biometrics information comprises biometrics information of a voice of the user, and wherein the learned model is further configured to determine that the user performing the authentication is in a threat situation, based on the authentication for the financial service being performed through the voice of the user.

7. The electronic device of claim 5, wherein the predetermined specific biometrics information comprises biometrics information of a face or a fingerprint of the user, and wherein the learned model is further configured to determine that the user performing the authentication is in a threat situation, based on the user making a specific gesture through the face or making a specific gesture through the finger during recognition of the fingerprint.

8. The electronic device of claim 1, wherein the processor is further configured to:

when the fake authentication is performed, provide a user interface (UI) indicating that the financial service is performed normally, and transmit, to a financial company server, a request to lock a transaction account in which the financial service is made.

9. An authentication method for an electronic device, the method comprising:

performing authentication for a financial service based on biometrics information of a user performing authentication for the financial service;

while performing an authentication for the financial service, acquiring an image by photographing a user performing the authentication and a background around the user through a camera;

applying the image to a learned model comprising an artificial intelligent algorithm to obtain information on an estimated relationship between the user and other users in the background around the user and information on a facial expression of the other users;

determining whether the user performing the authentication is in a threat situation based on information on an estimated relationship between the user and other users in the background around the user and information on a facial expression of the other users acquired from the image; and performing authentication for the financial service according to the acquired information, wherein the learned model is trained to identify a plurality of relationships related to the user using a plurality of pre-stored images related to the user, and based on the other users included in the image being identified, obtain the estimated relationship between the user and the other users from among the plurality of relationships, and wherein the method further comprises:

based on at least one pre-stored image including the other users being identified among the plurality of pre-stored images, obtaining the estimated relationship based on the at least one pre-stored image, and determining that the user is not in a threat situation based on the estimated relationship, based on at least one pre-stored image including the other users not being identified among the plurality of pre-stored images, determining whether the user performing authentication is in a threat situation using the information on the facial expression of the other users, based on that the user is not in a threat situation, performing authentication for the financial service based on the biometrics information, and based on that the user is in a threat situation, rejecting the authentication for the financial service or performing fake authentication.

10. The authentication method of claim 9, wherein the learned model is further configured to determine whether the user is in a threat situation using information on at least one of a movement of the user's eyes, pulse rate, facial color change, facial expression, a place where the user is present.

11. The authentication method of claim 10, wherein the learned model is further configured to:
receive input of personalized information of the user and common information of a plurality of arbitrary users in relation to the pulse rate, eye movement, facial color change, and facial expression, and
determine whether the user is in a threat situation based on the personalized information, the common information, and the information acquired from the image.

12. The authentication method of claim 9, wherein the biometrics information comprises at least one of a voice, a face, or a fingerprint of the user.

13. The authentication method of claim 10, wherein the performing the authentication comprises performing authentication for the financial service using predetermined specific biometrics information.

14. The authentication method of claim 13,
wherein the predetermined specific biometrics information comprises biometrics information of a voice of the user, and
wherein the learned model is further configured to determine that the user performing the authentication is in a threat situation, based on the authentication for the financial service being performed through the voice of the user.

15. The authentication method of claim 13,
wherein the predetermined specific biometrics information comprises biometrics information of a face or a fingerprint of the user, and
wherein the learned model is further configured to determine that the user performing the authentication is in a threat situation, based on the user making a specific gesture through the face or making a specific gesture through the finger during recognition of the fingerprint.

16. The authentication method of claim 9, further comprising:
when the fake authentication is performed, providing a user interface (UI) indicating that the financial service is performed normally, and transmitting, to a financial company server, a request to lock a transaction account in which the financial service is made.

17. The authentication method of claim 9, further comprising:
acquiring information from an external electronic device connected to the electronic device,
wherein the acquiring of the information on whether the user performing the authentication is in a threat situation comprises acquiring information on whether the user performing the authentication is in a threat situation from the learned model with the information acquired from the image and the information acquired from the external electronic device as input of the learned model.

18. The authentication method of claim 9, further comprising:
acquiring information from a social network service (SNS),
wherein the acquiring of the information on whether the user performing the authentication is in a threat situation comprises acquiring information on whether the user performing the authentication is in a threat situation from the learned model with the information acquired from the image and the information acquired from the SNS as input of the learned model.

* * * * *